US007461702B2

(12) United States Patent
Farnsworth et al.

(10) Patent No.: US 7,461,702 B2
(45) Date of Patent: Dec. 9, 2008

(54) COUPLING ASSEMBLY FOR A THREE POINT HITCH ASSEMBLY

(76) Inventors: Fred L. Farnsworth, 9100 W. Beaver St., Jacksonville, FL (US) 32220; Jason R. Farnsworth, 9100 W. Beaver St., Jacksonville, FL (US) 32220

( * ) Notice: Subject to any disclaimer, the term of this patent is extended or adjusted under 35 U.S.C. 154(b) by 296 days.

(21) Appl. No.: 11/171,680

(22) Filed: Jun. 30, 2005

(65) Prior Publication Data
US 2007/0000673 A1 Jan. 4, 2007

(51) Int. Cl.
A01B 59/06 (2006.01)
A01B 59/043 (2006.01)
(52) U.S. Cl. .................. 172/439; 172/443; 172/446
(58) Field of Classification Search .......... 172/319, 172/396, 439, 440, 441, 442, 443, 444, 445, 172/446, 447, 448, 449, 272
See application file for complete search history.

(56) References Cited

U.S. PATENT DOCUMENTS

| | | | | |
|---|---|---|---|---|
| 2,727,756 A | * | 12/1955 | Van Carlile | ................ 280/468 |
| 3,034,587 A | | 5/1962 | Dorkins et al. | |
| 3,220,751 A | | 11/1965 | Tweedale | |
| 3,427,046 A | * | 2/1969 | Muncke et al. | ............. 172/272 |
| 3,434,737 A | | 3/1969 | Bailey et al. | |
| 3,489,431 A | * | 1/1970 | Beckwith et al. | ............ 172/272 |
| 3,528,685 A | | 9/1970 | Eastman | |
| 3,572,759 A | * | 3/1971 | Baugh et al. | ................ 172/272 |
| 3,760,883 A | | 9/1973 | Birk | |
| 3,795,415 A | * | 3/1974 | Koch et al. | ................... 172/677 |
| 3,818,551 A | | 6/1974 | Coughran, Jr. | |
| 3,825,283 A | * | 7/1974 | Hansen | ........................ 172/439 |
| 4,068,959 A | | 1/1978 | Pemberton | |
| 4,071,105 A | | 1/1978 | Von Allworden | |
| 4,116,283 A | * | 9/1978 | Blessent | ...................... 172/443 |
| 4,232,878 A | | 11/1980 | Moore, Jr. | |
| 4,236,329 A | | 12/1980 | Hetrick | |
| 4,340,240 A | | 7/1982 | Anderson | |
| 4,944,354 A | | 7/1990 | Langen et al. | |
| 5,515,928 A | | 5/1996 | Niday | |
| 5,582,255 A | * | 12/1996 | Nikkel et al. | ................... 172/6 |
| 5,664,632 A | | 9/1997 | Frasier | |
| 6,478,094 B2 | | 11/2002 | Alexander et al. | |
| 6,758,285 B2 | | 7/2004 | Ollefs | |
| 6,764,270 B1 | | 7/2004 | Bernhardt et al. | |
| 7,008,168 B2 | * | 3/2006 | Bernhardt et al. | ........... 414/703 |

* cited by examiner

Primary Examiner—Thomas B Will
Assistant Examiner—Joel F Mitchell
(74) Attorney, Agent, or Firm—Thomas C. Saitta

(57) ABSTRACT

A coupling assembly for use with a tractor having a three point mounting hitch assembly having two extension legs telescopically retained by two generally vertical sleeve members slanted towards each other and two lateral extension arms telescopically retained by a cross sleeve member, wherein the lateral extension arms can be extended or retracted and wherein the extension legs can be extended or retracted to alter the relative positions of an upper hook and two lower hooks.

20 Claims, 4 Drawing Sheets

US 7,461,702 B2

COUPLING ASSEMBLY FOR A THREE POINT HITCH ASSEMBLY

BACKGROUND OF THE INVENTION

This invention relates generally to the field of mechanisms used to temporarily connect an implement to a tractor, and more particularly to mechanisms known as three point hitch systems or assemblies. Even more particularly, the invention relates to a coupling assembly that is mounted or connected to the three point hitch assembly of a tractor or similar equipment and which receives and retains an implement having three triangularly disposed pins in the standard three point pattern.

The three point tractor hitch assembly is a well known mechanism for connecting an implement to a tractor or similar vehicle. In general, a typical three point hitch assembly comprises an upper arm and two lower hitch arms, each having a hook to receive the pins of an implement, which are dispersed in the standard triangular pattern. Most known three point hitch assemblies are not fully automatic and require the operator to manually manipulate components, usually from the ground. Known systems are also susceptible to the implement becoming loose or dislodged during use. Examples of various types of three point hitch and similar implement mounting systems can be seen in U.S. Pat. No. 6,478,094 to Alexander et al., U.S. Pat. No. 6,758,285 to Ollefs, U.S. Pat. No. 3,434,737 to Bailey et al., U.S. Pat. No. 4,068,959 to Pemberton, U.S. Pat. No. 6,764,270 to Bernhardt et al., and U.S. Pat. No. 5,515,928 to Niday, among others.

It is an object of this invention to address the problems and drawbacks of the known three point hitch implement mounting systems and assemblies. It is an object to provide a three point mounting hitch assembly that does not require manual manipulation of the hitch components. It is an object to provide such an assembly that can be mounted onto standard tractor three point hitch assemblies. It is an object to provide such an assembly that provides a means to properly locate the upper and lower hooks relative to the implement pins using electric or hydraulic means. It is an object to provide such an assembly that allows the lower hooks to be spread and contracted horizontally relative to each other, and for the lower hooks to be spread or contracted vertically relative to the upper hook. It is an object to provide such an assembly that extends the lower hooks in a generally vertical yet slanted direction, such that the implement pins are wedged upon vertical retraction of the lower pins. It is an object to provide such an assembly wherein the lower hooks are spread horizontally simultaneously, and where the lower hooks are raised and lowered independently. Additional objects not expressly stated above will be apparent upon review of the disclosure to follow.

SUMMARY OF THE INVENTION

The invention is in general a coupling assembly for connection to or combination with a tractor three point mounting hitch assembly to receive and retain an implement having an upper pin and two lower pins disposed in the standard three point hitch pattern, wherein the coupling assembly connects to the lower hitch arms and upper mounting bracket of a tractor. The coupling assembly comprises a pair of opposing and telescoping lateral extension arms received by a central cross sleeve member disposed generally horizontally. Two generally vertical extension legs are telescopically received by two generally vertical sleeve members, with each such set being connected to one of the lateral extension arms. Means to extend and retract the lateral extension arms and means to extend and retract the vertical extension legs are provided, and preferably comprise electrical actuators operating piston rods. An upper arm assembly joins the cross sleeve member to the tractor upper mounting bracket, and means to lengthen and shorten the upper arm assembly is provided. An upper hook to receive and retain the upper pin of the implement is mounted to the cross sleeve member and a lower hook to receive and retain the lower pins of the implement is mounted on each leg extension.

In this manner, the vertical spread distance between the upper hook and the lower hooks can be increased or decreased, and the horizontal spread distance between the two lower hooks can be increased or decreased. The lateral extension arms are moved simultaneously, while the leg extensions may be moved independently. Means to lock in position the leg extensions and the lateral extension arms are provided. Preferably, electric actuators are used to operate the leg extensions and the lateral extension arms, while a hydraulic cylinder is used to operate the upper arm assembly.

The coupling assembly allows the tractor operator to attach an implement by lowering the upper hook onto the implement upper pin, retracting the lateral extension arms to properly locate the lower hooks under the implement lower pins, then raising the extension legs to secure the lower pins. Preferably, the extension legs are non-parallel and inclined inwardly such that there is a greater distance between their lower ends than their upper ends. Through this construction, the implement pins are wedged laterally as the extension legs are raised, thereby further securing the implement from being loosened or dislodged during use.

DETAILED DESCRIPTION OF THE INVENTION

Figure 1:
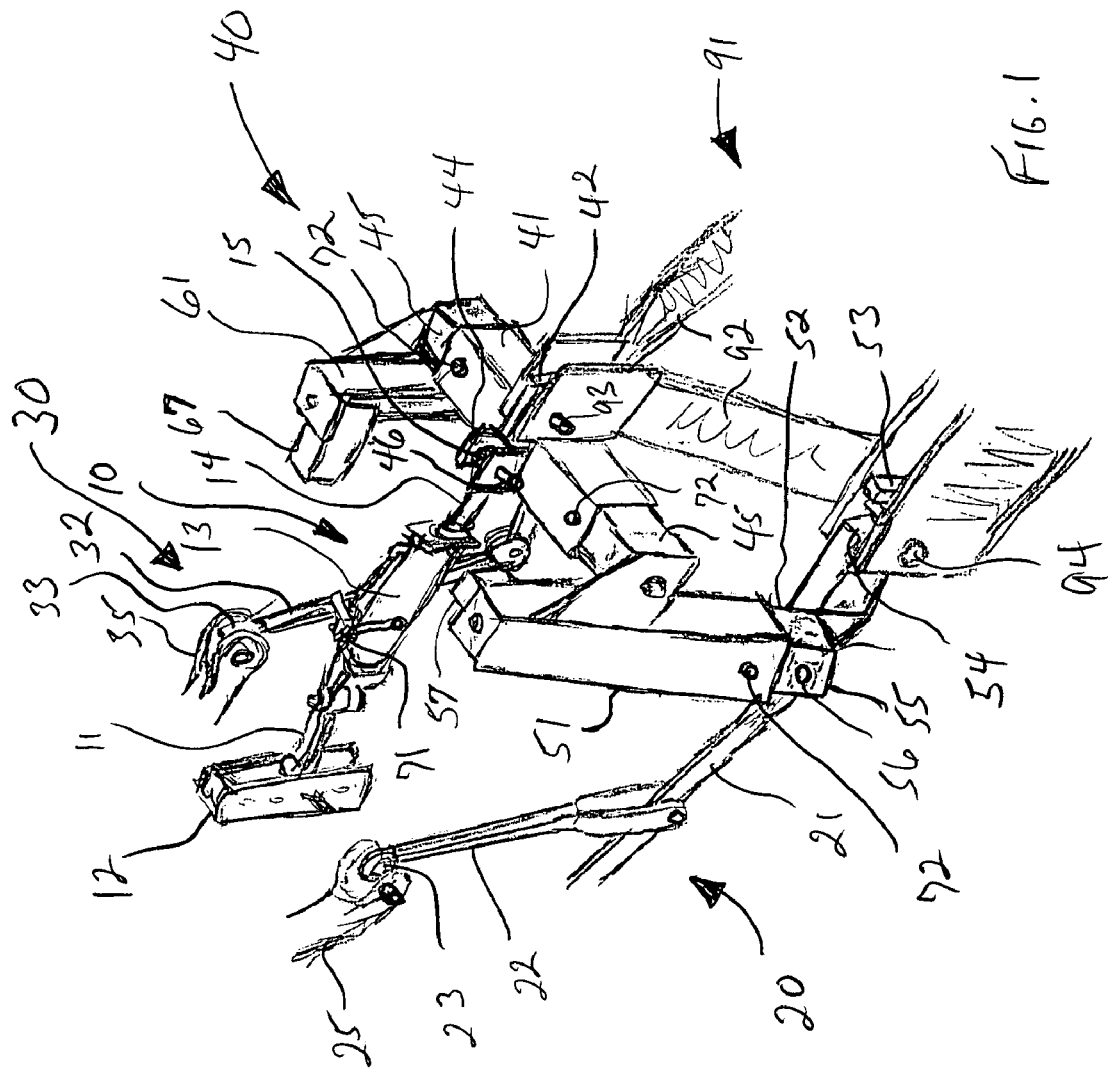
FIG. 1 is a perspective view of the invention showing the three point mounting hitch assembly of a tractor, the coupling assembly and a portion of an implement as mounted on the coupling assembly and tractor.
Figure 2:
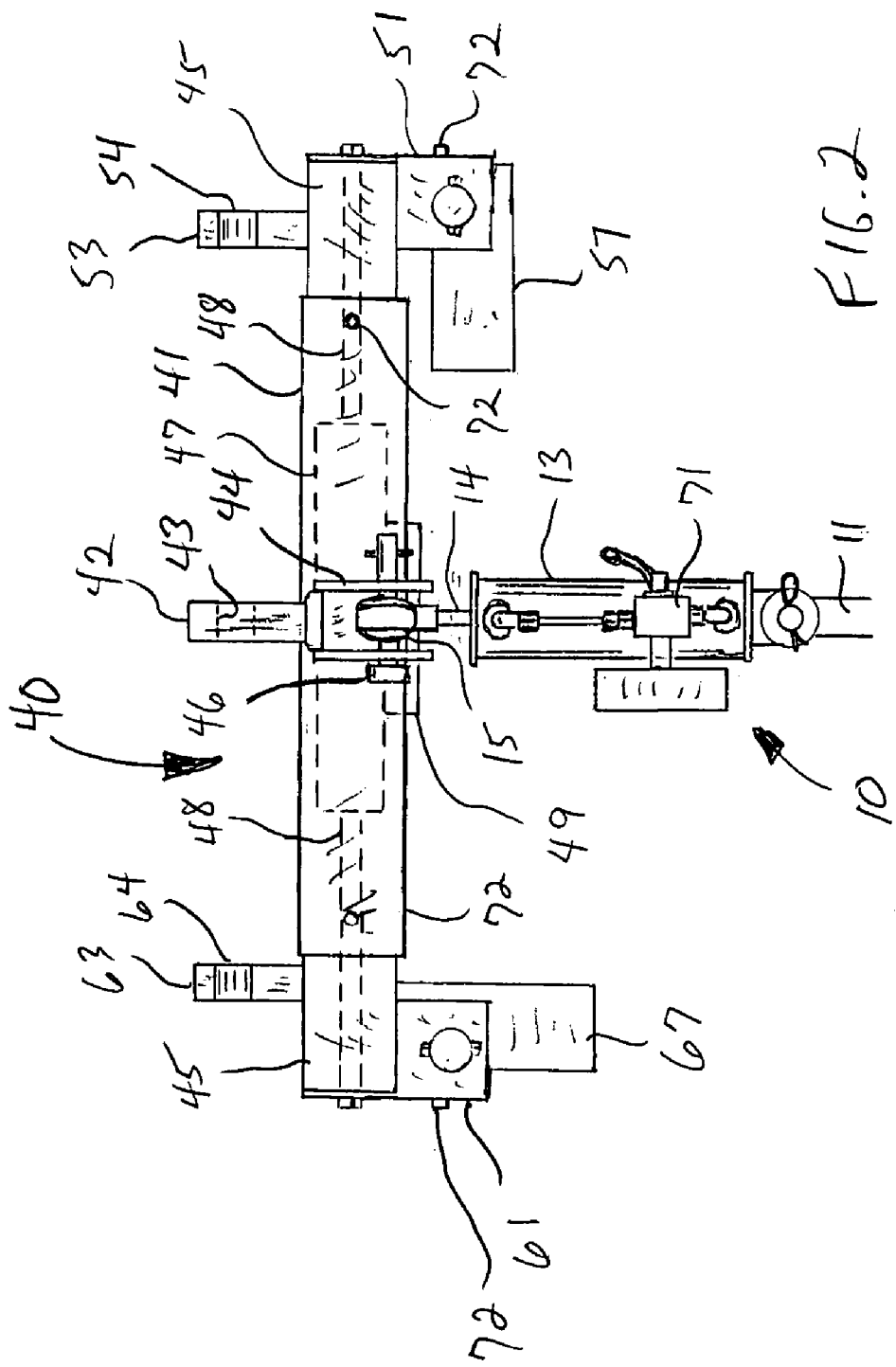
FIG. 2 is a top view of the coupling assembly.
Figure 3:
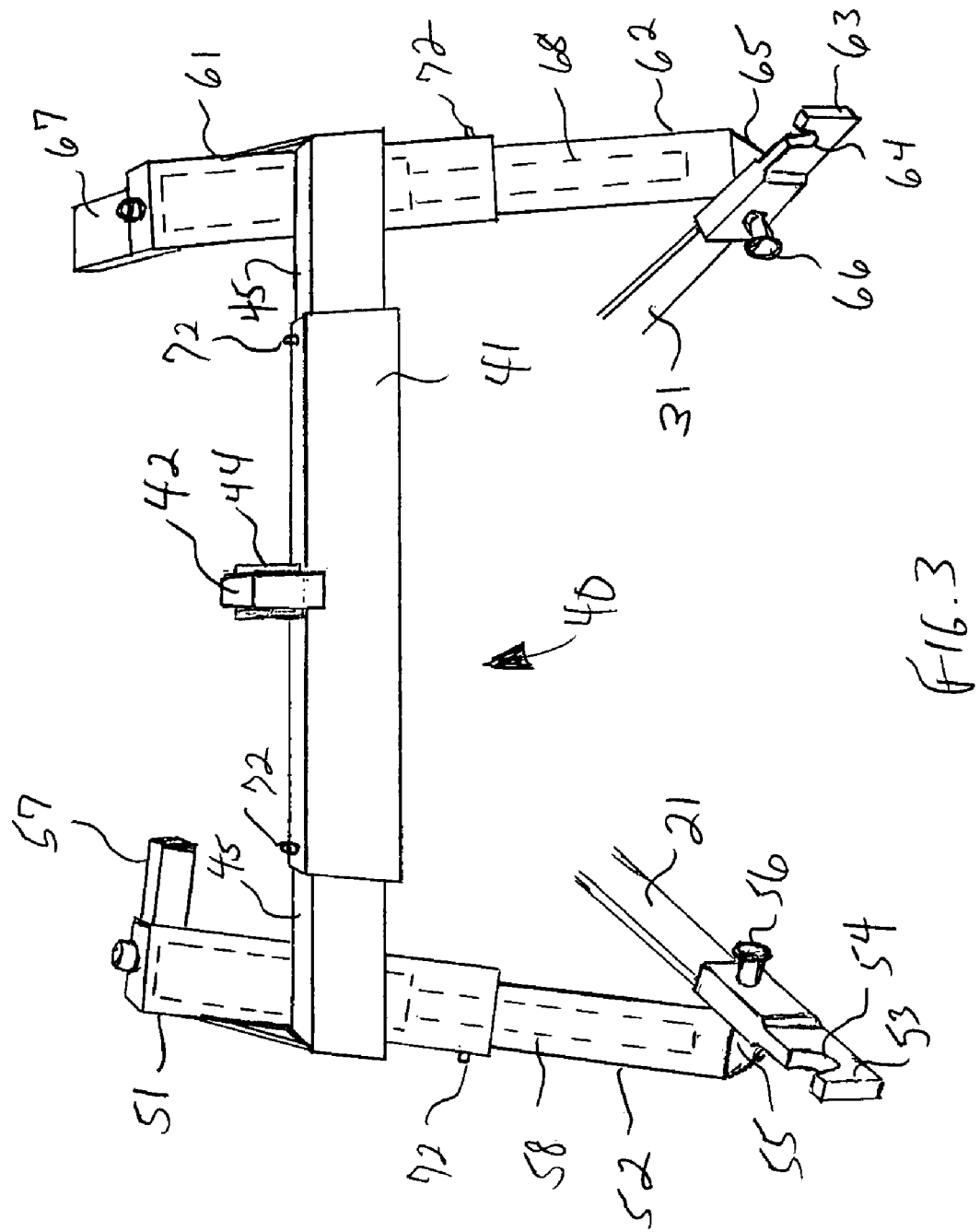
FIG. 3 is a rear view of the coupling assembly showing the generally horizontal assembly comprising the cross sleeve member and lateral extension arms, and the generally vertical assembly comprising the vertical sleeve members, vertical extension legs and lower hook members, shown connected to the tractor lower hitch arm.
Figure 4:
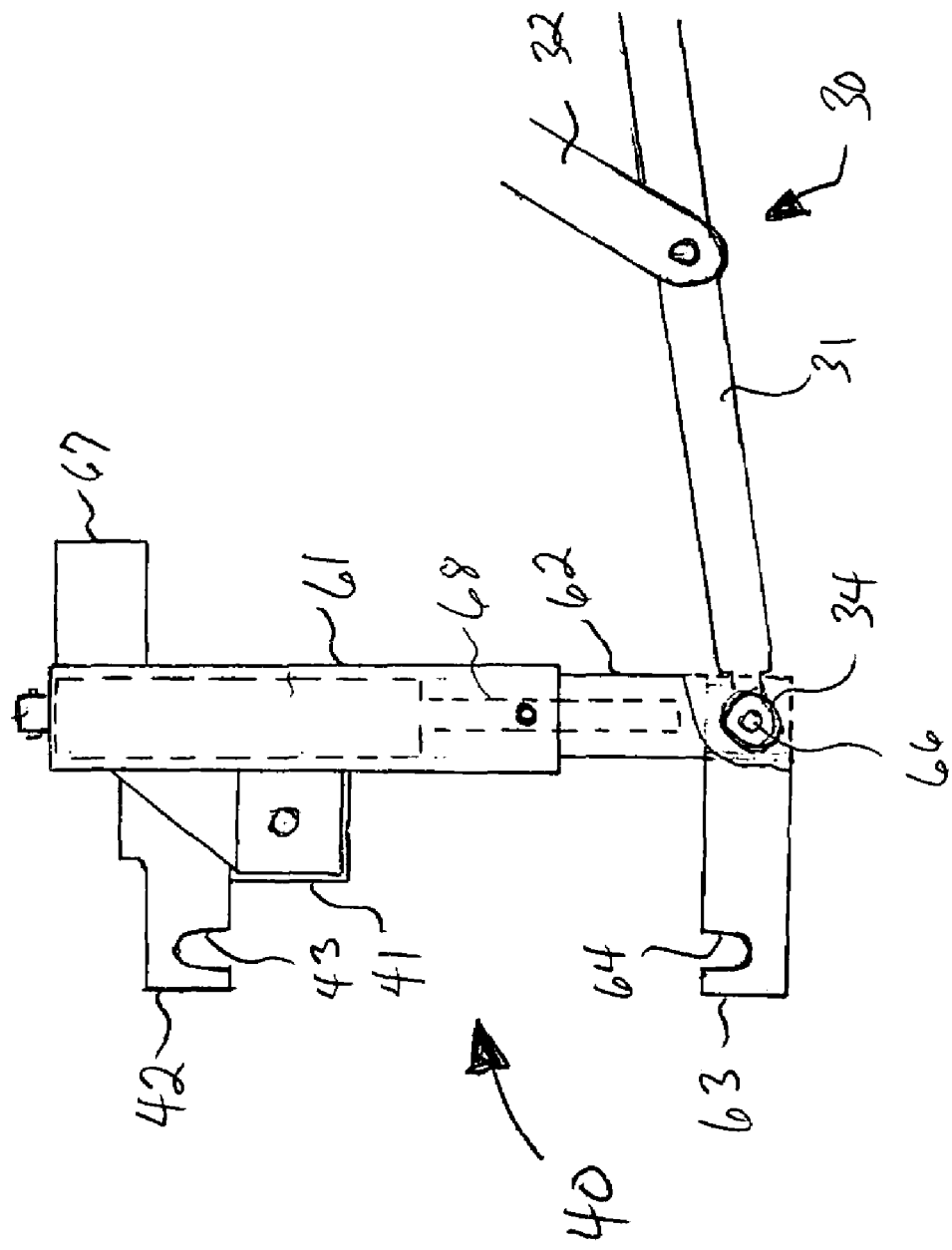
FIG. 4 is a side view of the coupling assembly showing the generally vertical assembly comprising the vertical sleeve members, vertical extension legs and lower hook members, as well as the upper hook member, shown connected to the tractor lower hitch arm.

With reference to the drawings, the invention will now be described in detail with regard for the best mode and the preferred embodiment. In general, the invention is a three point tractor hitch apparatus for coupling implements to the rear of a tractor, but it is to be understood that three point mounting hitch assemblies are also utilized with other types of equipment and the coupling assembly as described herein is applicable in those situations as well. The apparatus allows the tractor operator to quickly and easily couple the implement to the tractor without having to dismount from the tractor. The apparatus is suitable for use with various implements having different heights and widths at a three point coupling configuration, and is particularly suited for use with Category 1 and Category 2 implements. A three point coupling for an implement 91 comprises a centrally located upper pin or top link 93 and a pair of lower pins or bottom links 94 mounted on a frame or mast 92, such that the links 93 and 94 are accessible to the upper hook 42 and lower hooks 53 and 63 of the three point hitch apparatus mounted onto the tractor.

A typical three point tractor hitch assembly comprises a pair of lower arm assemblies 20 and 30. The lower arm assemblies 20 and 30 comprise lower hitch arms 21 and 31 that are pivotally connected to the tractor, preferably through a ball joint connection. The lower hitch arms 21 and 31 are retained by link arms 22 and 32 that are pivotally connected to each lower hitch arm 21 and 31, respectively. The upper end of the link arms 22 and 32 are connected by link arm ball joints 23 and 33, respectively, to link arm mounts 25 and 35, as shown in FIG. 1. Hitch arm ball joints (one shown at 34) connect the distal ends of the lower hitch arms 21 and 31, respectively, to mounting brackets 55 and 65 on the vertical extension legs 52 and 62. In this manner, limited independent vertical and horizontal movement of the distal ends of the lower hitch arms 21 and 31 is allowed, such that the lower hitch arms 21 and 31 can be raised, lowered spread apart or brought closer together.

The invention is a coupling assembly 40 and comprises an upper arm assembly 10 comprising an upper hitch arm 11 pivotally attached to an upper arm mounting means such as a standard hitch arm mounting bracket 12 affixed to the tractor in a manner that allows the upper hitch arm 11 to pivot in the vertical direction. An upper arm hydraulic cylinder 13, or alternatively a pneumatic cylinder, a mechanical drive mechanism or any other equivalent means to lengthen and shorten the upper arm assembly 10, is pivotally connected to the upper hitch arm 11 in a manner that allows the upper arm hydraulic cylinder 13 to pivot laterally. Extending from the upper arm hydraulic cylinder 13 is the upper arm hydraulic cylinder rod 14 that upon actuation is extended out from and retracted into the hydraulic cylinder 13. An upper arm ball joint 15 is disposed on the distal end of the rod 14 for connecting the upper arm assembly 10 to the cross sleeve member 41 of the coupling assembly 40. Most preferably, the upper arm hydraulic cylinder 13 is provided with a hydraulic locking valve 71 that permits the cylinder 13 to be locked in a desired position such that the rod 14 will not be pulled or pushed by outside stresses during implement use.

The coupling assembly 40 is mounted to the tractor upper arm mounting means 12 and the lower arm assemblies 20 and 30, such that the implement 91 is connected to the coupling assembly 40 rather than directly to the tractor three point mounting hitch. The coupling assembly 40 is a means to vary the relative positions of the upper hook 42 and lower hooks 53 and 63, such that the vertical spread distance between the upper hook 42 and the lower hooks 53 and 63 can be changed, and such that the horizontal spread distance between the lower hooks 53 and 63 themselves can be changed. The coupling assembly 40 is composed primarily of tube steel, angle iron and like material such that a strong, rigid and durable assembly is created.

In general, in addition to the upper arm assembly 10, the coupling assembly 40 comprises a generally horizontal assembly and a pair of generally vertical, but preferably slightly slanted, assemblies. The generally horizontal assembly comprises a cross sleeve 41 to which is mounted an upper hook 42 having a downwardly oriented slot 43 to receive the upper pin 93 of the implement 91. Cross sleeve 41 receives in telescoping manner a pair of opposing lateral extension arms 45, such that the lateral extension arms 45 can be extended from the cross sleeve 41 to lengthen the overall width dimension or retracted into cross sleeve 41 to shorten the overall width dimension. A centrally located mounting bracket 44 is provided on cross sleeve 41 to receive the upper arm ball joint 15 of upper arm assembly 10, which is secured by pin 46.

The generally vertical assemblies comprise a vertical sleeve 51 connected to outer end of one lateral extension arm 45 and a vertical sleeve 61 connected to the outer end of the other lateral extension arm 45. Although the vertical sleeves 51 and 61 may be parallel, preferably vertical sleeves 51 and 61 are disposed in non-parallel manner to each other, most preferably at approximately 10 to 15 degrees from vertical, such that the vertical sleeves 51 and 61 slant inwardly toward each other such that the distance between the upper ends of the vertical sleeves 51 and 61 is less than the distance between the lower ends. Each vertical sleeve 51 and 61 receives in telescoping meaner a vertical extension leg 52 and 62, respectively, such that the height dimension can be lengthened by extending the extension legs 52 and 62 from the vertical sleeves 51 and 61 or can be shortened by retracting the extension legs 52 and 62. Lower hook members 53 and 63, each having an upwardly oriented slot 54 and 64 are mounted on the lower ends of the extension legs 52 and 62, respectively. Mounting brackets 55 and 65 are provided on the lower ends of the extension legs 52 and 62, respectively, to receive the hitch arm ball joints 24 and 34 of the lower hitch arms 21 and 31, which are held in place by pins 56 and 66, respectively.

Means to simultaneously extend and retract the lateral extension arms 45 relative to the cross sleeve 41 and means to independently extend and retract the extension legs 52 and 62 relative to the vertical sleeves 51 and 61 are provided. Preferably, these means are hydraulic or electric actuators, but similar means such as pneumatic cylinders or the like may be utilized. As shown, preferably a dual piston cylinder 47 operated by an electrical actuator 49 is mounted within the cross sleeve 41, such that a pair of rods 48 are operated by the cylinder 47 to extend or retract the lateral extension arms 45 in unison. Electrical actuators 57 and 67 are mounted to vertical sleeves 51 and 61 to operate rods 58 and 68 to extend and retract the extension legs 52 and 62, respectively.

Operation of the upper arm hitch cylinder 13, the cross sleeve cylinder 47 and the vertical sleeve actuators 57 and 67 is controlled by suitable electrical and hydraulic conduits and connectors that terminate in a control housing located within reach of the tractor operator. Preferably, the electrical system controlling the actuators 49, 57 and 67 is provided with a means to lock the actuators 49, 57 and 67 in a desired position, such as by grounding the system through a locking switch in the control housing, such that the position of the lateral extension arms 45 and the vertical extension legs 52 and 62 can be secured during use. In addition, locking screws 72 or similar means may be provided on the cross sleeve 41 and the vertical sleeves 51 and 61 as a back-up securing system, such that the position of the lateral extension arms 45 and the vertical extension legs 52 and 62 can be further secured during use.

To use the invention, the tractor operator initiates the actuator 49 to spread the lateral extension arms 45 and the actuators 57 and 67 to extend the vertical extension legs 52 and 62. The tractor is then positioned such that the upper hook 42 is centered above the upper pin 93 of the implement 91. The coupling assembly 40 is properly angled relative to the implement by operating the upper arm hydraulic cylinder 13. The upper hook 42 is then lowered onto the upper pin 93 such that the slot 43 receives the upper pin 93. The lower hooks 53 and 63 are then brought inward so as to be positioned below the lower pins 94 of the implement 91 by retracting the lateral extension arms 45. Finally, the extension legs 52 and 62 are retracted to secure the implement lower pins 94 in the slots 54 and 64 of the lower hooks 53 and 63. In the preferred embodiment wherein the vertical sleeves 51 and 61 and the extension legs 52 and 62 angle inward, this final operation serves to wedge the pins 93 and 94 of the implement 91 in a secure manner to better retain the implement 91 during use. The hydraulic locking valve 71 and electric actuators 49, 57 and 67 are locked, and the implement 91 is now securely hitched to the tractor. Release of the implement 91 is accomplished by reversing the steps. At no time does the tractor operator have to dismount or manually adjust any of the elements of the three point hitch assembly, except where it is further desirable to utilize the locking screws 72.

Alternatively, the upper hook 42 may face upwards and the lower hooks 53 and 63 may face downward, in which case the upper arm assembly 10 is used to raise the upper hook 42 and the lower hooks 53 and 63 are extended to secure the implement 91. In this embodiment, the angle of the vertical sleeve members 51 and 61 and the extension legs 52 and 62 may be reversed such that the distance between the bottom ends is less than between the upper ends.

Where the implement 91 is to be coupled to the tractor on uneven terrain, or if the pins 93 and 94 of the implement 91 are not properly spaced, either of the lower hooks 53 and 63 can be independently moved in the vertical direction and/or the coupling assembly 40 can be rotated by manipulating the lower arm assemblies 20 and 30 in order to achieve proper alignment with the implement pins 93 and 94. For use with standard implements, a lateral spread between the lower hooks 53 and 63 of approximately 21 to 35 inches and a vertical spread of approximately 19 to 31 inches between the upper hook 42 and the lower hooks 53 and 63 has been found suitable.

It is understood that equivalents and substitutions to certain elements described above may be obvious to those skilled in the art, and therefore the true scope and definition of the invention is to be as set forth in the following claims.

We claim:

1. A coupling assembly for connecting an implement to a three point mounting hitch assembly on a tractor, the implement comprising a mounting frame having an upper pin and two lower pins, said coupling assembly comprising:
   an upper hook to receive and retain the upper pin of an implement, said upper hook mounted on a generally horizontal assembly comprising lateral extension arms;
   two lower hooks to receive and retain the lower pins of an implement, and
   extension legs mounted to said lateral extension arms;
   means to simultaneously extend and retract said lateral extension arms such that the horizontal spread distance between said lower hooks may be increased or decreased;
   means to independently extend and retract said extension legs, such that the vertical spread distance between said upper hook and said two lower hooks may be increased or decreased.

2. The assembly of claim 1, further comprising an upper arm assembly comprising means to extend or shorten said upper arm assembly.

3. The assembly of claim 2, wherein said means to extend or shorten said upper arm assembly comprises a hydraulic cylinder.

4. The assembly of claim 3, further comprising a cross sleeve member retaining said lateral extension arms in a telescoping manner, wherein said upper arm assembly is joined to said cross sleeve member and said upper hook is joined to said upper arm assembly.

5. The assembly of claim 1, further comprising two vertical sleeve members retaining said extension legs in a telescoping manner, said vertical sleeve members joined to said lateral extension arms.

6. The assembly of claim 5, wherein said means to extend and retract said extension legs comprise two electrical actuators.

7. The assembly of claim 1, further comprising a cross sleeve member retaining said lateral extension arms in a telescoping manner.

8. The assembly of claim 7, wherein said means to simultaneously extend and retract said lateral extension arms comprises an electrical actuator operating a dual piston cylinder.

9. The assembly of claim 1, wherein said extension legs are non-parallel to each other.

10. A coupling assembly to connect an implement to a three point mounting hitch on a tractor, the tractor three point mounting hitch assembly comprising an upper arm mounting means and two lower arm assemblies each having a lower hitch arm, said coupling assembly comprising:
    an upper hook and two lower hooks, said lower hooks disposed on two extension legs telescopically retained by two vertical sleeve members;
    two lateral extension arms telescopically retained by a cross sleeve member, said vertical sleeve members mounted to said lateral extension arms and said upper hook mounted to said cross sleeve member;
    means to simultaneously extend and retract said lateral extension arms, such that the distance between said lower hooks may be increased or decreased;
    means to independently extend and retract said extension legs, such that the vertical distance between the upper hook and the lower hooks may be increased or decreased.

11. The assembly of claim 10, further comprising an upper arm assembly connected to said cross sleeve member, said upper arm assembly comprising means to extend or shorten said upper arm assembly.

12. The assembly of claim 11, wherein said upper arm assembly is adapted to connect to a mounting bracket on a tractor, and wherein said extension legs further comprise mounting brackets to receive lower hitch arms of a tractor.

13. The assembly of claim 10, wherein said means to simultaneously extend and retract said lateral extension arms and said means to independently extend and retract said extension legs comprise electrical actuators.

14. The assembly of claim 11, wherein said means to extend or shorten said upper arm assembly comprises a hydraulic cylinder.

15. The assembly of claim 10, wherein said vertical sleeve members are non-parallel to each other, such that the vertical sleeve members slant towards each other at their upper ends.

16. The assembly of claim 15, wherein said vertical sleeve members are slanted at an angle of approximately 10 to 15 degrees from vertical.

17. A coupling assembly in combination with a tractor having a three point mounting hitch comprising an upper arm mounting means and two lower arm assemblies each having a lower hitch arm, said coupling assembly adapted to temporarily retain an implement comprising a mounting frame having an upper pin and two lower pins, said coupling assembly comprising:
    an upper hook to receive and retain the upper pin of an implement;
    two lower hooks to receive and retain the lower pins of an implement, said lower hooks disposed on two extension legs telescopically retained by two vertical sleeve members, wherein said vertical sleeve members are slanted towards each other, and wherein said extension legs are connected to said tractor lower hitch arms;

two lateral extension arms telescopically retained by a cross sleeve member, wherein said lateral extension arms extend and retract in opposite directions from said cross sleeve member and wherein said vertical sleeve members are mounted to said lateral extension arms and said upper hook is mounted to said cross sleeve member;

an upper arm assembly connected to said cross sleeve member and to said tractor upper arm mounting means, said upper arm assembly comprising means to extend or shorten said upper arm assembly;

means to simultaneously extend and retract said lateral extension arms relative to said cross sleeve member, such that the distance between said vertical sleeve members, said vertical leg extensions, lower hooks may be increased or decreased;

means to independently extend and retract said extension legs relative to said vertical sleeve members, such that the vertical distance between the upper hook and the lower hooks may be increased or decreased.

18. The assembly of claim 17, wherein said means to simultaneously extend and retract said lateral extension arms and said means to independently extend and retract said extension legs comprise electrical actuators, and wherein means to extend or shorten said upper arm assembly comprises a hydraulic cylinder.

19. The assembly of claim 17, further comprising means to lock in a particular position said means to simultaneously extend and retract said lateral extension arms, said means to independently extend and retract said extension legs comprise electrical actuators, and said means to extend or shorten said upper arm assembly comprises a hydraulic cylinder.

20. The assembly of claim 17, wherein said vertical sleeve members are slanted towards each other at an angle of approximately 10 to 15 degrees from vertical.

* * * * *